United States Patent
Scott et al.

(10) Patent No.: US 8,558,133 B2
(45) Date of Patent: Oct. 15, 2013

(54) SYSTEM AND METHOD OF COMPUTING THE OPERATING PARAMETERS OF A FORGE WELDING MACHINE

(75) Inventors: Paul F. Scott, Farmington, CT (US); Michael A. Nallen, Old Saybrook, CT (US); Gary A. Doyon, Grosse Pointe Farms, MI (US); John H. Mortimer, Little Egg Harbor Township, NJ (US); Oleg S. Fishman, Maple Glen, PA (US)

(73) Assignee: Thermatool Corp., East Haven, CT (US)

(*) Notice: Subject to any disclaimer, the term of this patent is extended or adjusted under 35 U.S.C. 154(b) by 674 days.

(21) Appl. No.: 12/728,714

(22) Filed: Mar. 22, 2010

(65) Prior Publication Data
US 2010/0170881 A1    Jul. 8, 2010

Related U.S. Application Data

(62) Division of application No. 11/203,363, filed on Aug. 12, 2005, now Pat. No. 7,683,288.

(51) Int. Cl.
*B23K 13/08* (2006.01)
(52) U.S. Cl.
USPC ......................... 219/61.2; 219/61.5
(58) Field of Classification Search
USPC ........................ 219/61.2–61.5, 608
See application file for complete search history.

(56) References Cited

U.S. PATENT DOCUMENTS

| | | | |
|---|---|---|---|
| 4,602,148 | A | 7/1986 | Ramsey |
| 5,223,683 | A | 6/1993 | Ishizaka |
| 5,360,156 | A | 11/1994 | Ishizaka et al. |
| 5,828,032 | A | 10/1998 | Krzys et al. |
| 5,889,262 | A | 3/1999 | Oh et al. |

FOREIGN PATENT DOCUMENTS

| | | |
|---|---|---|
| JP | 5-318142 A | 12/1993 |
| JP | 8-281451 A | 10/1996 |
| JP | 10-211586 A | 8/1998 |
| JP | 2001-150154 A | 6/2001 |
| WO | 96/04099 A1 | 2/1996 |
| WO | 02/078891 A1 | 10/2002 |

OTHER PUBLICATIONS

Shah, A.K. et al.: Weld Heat-Affected Zone in Ti-6Al-4V Alloy, Part 1—Computer Simulation of the Effect of Weld Variables on the Thermal Cycles in the HAZ'; Welding Journal, American Welding Society, Miami, FL, US., vol. 74 ~ No. 9, Sep. 1, 1995, pp. 297-S, XP000542815, ISSN: 0043-2296.*

* cited by examiner

*Primary Examiner* — Brian Jennison
(74) *Attorney, Agent, or Firm* — Philip O. Post

(57) ABSTRACT

A method for setting the operating frequency of a forge welding machine for a preferred width of the of the heat affected zone during a forge weld. A computer program executes a self-tuning routine to determine the operating frequency in response to an inputted value of a preferred width of the heat affected zone. The operating power setting for the forge welding machine may also be determined in combination with the operating frequency in response to an inputted value of weld temperature.

13 Claims, 7 Drawing Sheets

SYSTEM AND METHOD OF COMPUTING THE OPERATING PARAMETERS OF A FORGE WELDING MACHINE

CROSS REFERENCE TO RELATED APPLICATIONS

This is a divisional application of application Ser. No. 11/203,363, filed Aug. 12, 2005, which application is hereby incorporated herein by reference in its entireties.

FIELD OF THE INVENTION

The present invention generally relates to forge welding processes and to controlling the parameters of a forge welding machine in response to an inputted width of the heat affected zone and weld temperature for the forge welding process, and in particular to setting the operating frequency of the forge welding machine in response to the inputted width of the heat affect zone and weld temperature for the forge welding process.

BACKGROUND OF THE INVENTION

Forge welding includes the bonding together of metal parts, such as plates. For example FIG. 1(a) illustrates a typical partial T-joint forge weld 101 made between an edge of plate 103 and surface of plate 105, and FIG. 1(b) illustrates a typical square butt partial forge weld 107 made between facing edges of plates 109 and 111. Forge welding also includes the bonding together of edge portions of a folded metal sheet or strip wherein the edge portions are forced together at a weld point as the strip is longitudinally advanced in the direction of the formed weld seam. For example in FIG. 2, tube 113 is formed from a metal strip forced together at weld point 115 to form weld seam 117 as the strip advances in the direction of the single headed arrow and pressure force is applied in the directions indicated by the double headed arrows to force the edge portions of the strip together.

In a forge welding process high pressure is applied at the weld point, which is heated to the welding temperature, to produce the weld. Generally the welding temperature is below, but possibly near to, the melting point of the metal being weld. Heating the metal to welding temperature may be accomplished by using a suitable source of energy, such as a laser, electron beam, electric resistance or high frequency electric induction.

A forge welding process results in the creation of a heat affected zone (HAZ), which is the portion of the metal that was not melted during the welding process, but whose microstructure and mechanical properties were altered by the heat from the process. For example in FIG. 2 dotted lines 118 indicate the generalized outer boundary of the HAZ on either side of weld seam 117. As more clearly shown in FIG. 3(a) and FIG. 3(b) the width of the HAZ, $X_E$, is equal to the distance between outer boundary lines 118. While in practice the outer boundaries of the HAZ may not be uniformly linear along the entire length of the weld, the width of the HAZ may be generally approximated by linear boundary lines. Minimizing the width of the HAZ generally minimizes the amount of metal that has properties different from those of the unheated metal part. The preferred or effective width of the HAZ is a complex function of many welding parameters including, but not limited to, the welding frequency, part wall thickness, part geometry, weld heating length, and angle and speed of the part at the weld point.

One particular application of induction forge welding is high frequency induction tube and pipe welding wherein high pressures are applied for very short periods of time, but right at the melt point temperature, to two edges of a strip forced into an oval shape by a tube forming machine before the adjacent edges of the strip reach the weld point as diagrammatically illustrated in FIG. 2, FIG. 3(a) and FIG. 3(b). At this temperature diffusion rates in the solid phase are very high and a quality bond results in a very short period of time. Ideally all of the melted metal should be squeezed from the bond plane into the inside or outside diameter weld beads, and the bond has no melted or cast metal. In FIG. 2 induction power can be supplied from a suitable ac power source (not shown in the figure) to induction coil 121 to induce current in the metal around a "V" shaped region formed by forcing edges of the strip together. The induced current flows around the back of the tube and then along the open "V" shaped edges to weld point 115 as illustrated by the typical flux line 119 (shown as dashed line) in FIG. 2. The length, y, of this "V" shaped region is approximately equal to the distance between the end of the coil closest to the weld point and the weld point. Generally since this length is relative to a particular forge welding machine, other definitions of this distance may be used as long as the defined distance is consistently use for a particular forge welding machine. The length, y, can also be referred to as the weld heating length. While a solenoidal coil is shown in FIG. 2 other coil arrangements may be used.

The effective width of the HAZ is a complex function of many welding parameters including, but not limited to, the welding frequency, component wall thickness, component geometry, weld heating length and angle, part joining speed, and part material. The following illustrates how these parameters can be mathematically applied.

The electrical reference depth, $\xi$, or penetration depth, which defines the distance from the edge of the metal part at which the induced current decreases approximately exponentially to $e^{-1}$ (0.368) of its value at the surface, when the process is an induction forge welding process, can be calculated from equation (1):

$$\xi = \sqrt{\frac{\rho}{\pi f \mu}}$$

where $\rho$ is the electrical resistivity of the metal part, $\mu$ is the relative magnetic permeability of the metal part, f is the electrical welding frequency of the supplied power, and $\pi$ is the constant pi (3.14159).

The thermal reference depth, $\delta$, or thermal diffusion depth, which represents how deeply the edge is heated by thermal conduction, may be calculated from equation (2):

$$\delta = \sqrt{\frac{\pi \varepsilon y}{4v}}$$

where $\varepsilon$ is the thermal diffusivity of the metal part, y is the length of the "V," which is also referred to as the weld heating length, and v is the speed at which the metal part passes the weld point, which is also referred to as the weld velocity.

There is a functional relationship between the electrical reference depth and width of the HAZ when both of these quantities are normalized by the thermal diffusion depth.

A normalized electrical reference depth, $Z_n$, can be calculated from equation (3):

$$Z_n = \frac{\xi}{\delta}.$$

Normalized width of the HAZ, $X_n$, can be calculated from equation (4):

$$X_n = a_o + a_1 Z_n + a_2 Z_n^2 + a_3 Z_n^3.$$

Equation (4), or the normalized width of the HAZ polynomial, can be established by experimental forge welding of specific types of metal materials. For example each of empirical data points $x_1$ through $x_{18}$ in FIG. 4 represent a normalized electrical reference depth ($Z_n$) and corresponding normalized width of the HAZ ($X_n$). Any suitable model can be used to fit the collected empirical data to a curve. In this particular example a suitable non-linear curve-fitting model is used to fit the data points to an equation with the polynomial form of equation (4) as diagrammatically illustrated by polynomial curve $p_1$ in FIG. 4. The polynomial is generally of the form $X_n = f(Z_n)$ and the coefficients $a_0$, $a_1$, $a_2$ and $a_3$ in equation (4) represent coefficients derived for a specific material in the experiments or trials that resulted in the empirical data points.

Effective weld power, $P_E$, can be calculated from equation (5):

$$P_E = H \cdot \gamma \cdot X_E \cdot h \cdot v$$

where H is equal to the enthalpy of the forge welding process; that is, the change in enthalpy (measured in joules when $P_E$ is calculated in watts) of a metal in a forge welding process wherein the temperature of the metal is raised from its pre-weld temperature to its weld temperature;

γ is the density of the metal (measured in kilograms per cubic meters);

$X_E$ is the effective width of the heat affected zone (measured in meters);

h is the thickness of the metal being welded together (measured in meters); and and v is the speed of the metal being welded at the weld point, or weld velocity (measured in meters per second).

One object of the present invention is to achieve a forge weld with a forge welding machine by specifying the preferred width of the heat affected zone for the weld and preferred weld temperature in the forge welding of one or more materials without knowledge of the required forge welding machine operating frequency or operating power setting.

Another object of the present invention is to set the operating frequency and operating power setting of a forge welding machine in a forge welding process to achieve a desired weld without input of the frequency and power settings by an operator of the forge welding machine.

SUMMARY OF THE INVENTION

In one aspect the present invention is a system for controlling the parameters of a forge welding machine for the forge welding of one or more materials. The system comprises a computer, one or more computer memory storage devices and a computer program. The computer program executes a self-tuning routine to compute the operating frequency and operating power setting for the forge welding machine in response to an inputted width of the heat affected zone and an inputted weld temperature.

In another aspect the present invention is a method for computing the operating frequency and operating power setting for a forge welding machine in a forge welding of one or more materials. The method includes inputting a width for the heat affected zone and inputting a weld temperature for computing the operating frequency and operating power setting of the forge welding machine. Forge welding machine data, such as weld velocity and weld heating length, and parameters of the one or more materials, such as their thickness, density and enthalpy, are referenced for computing the operating frequency and operating power setting. The width of the heat affected zone and weld temperature may be measured during the forge welding to adjust the computed operating frequency or operating power frequency so that the measured width of the heat affected zone and measured weld temperature are equal to the inputted width of the heat affected zone and the inputted weld temperature within any allowed tolerance.

Other aspects of the invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 6A:
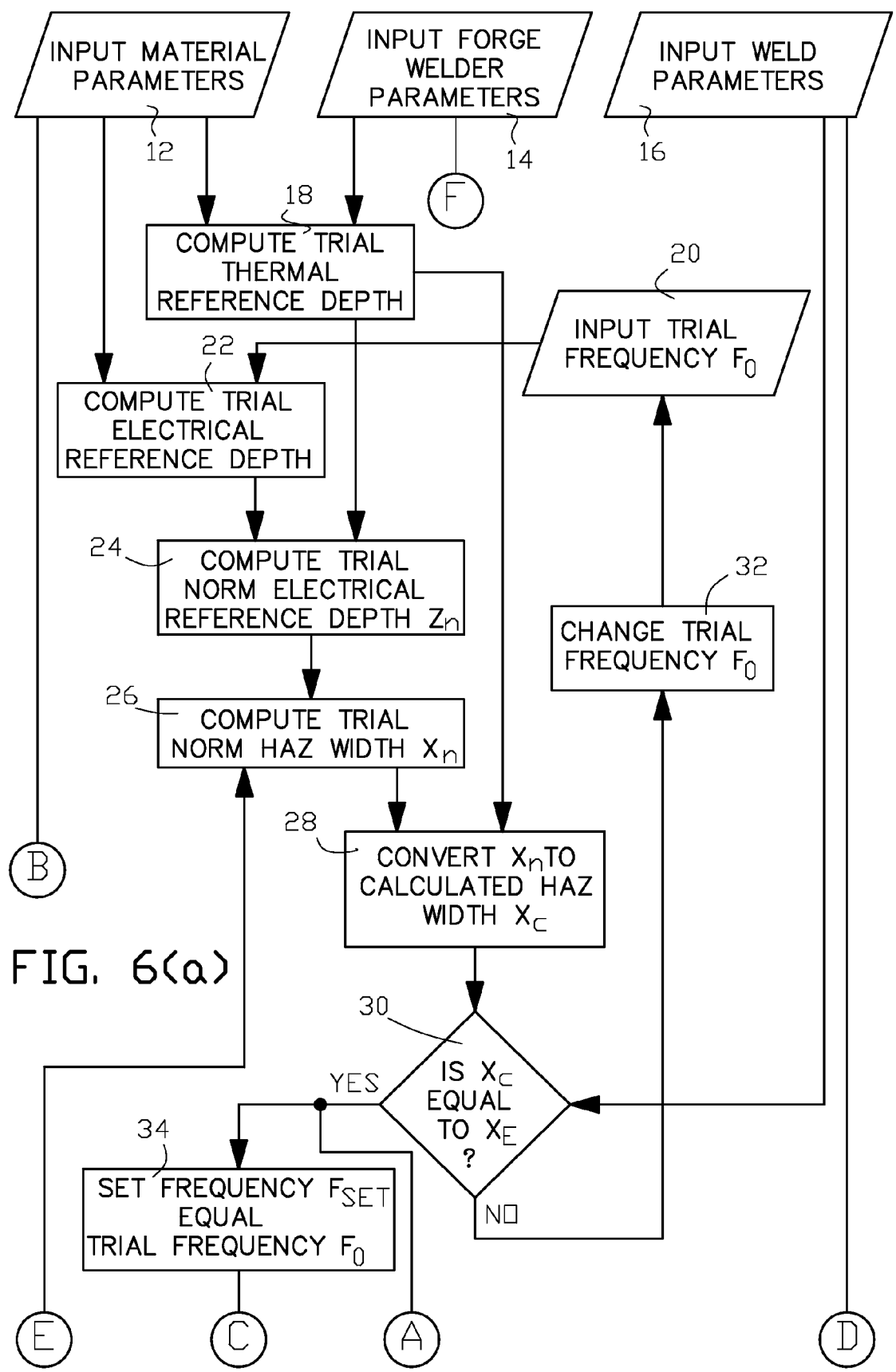
FIG. 6(a) and FIG. 6(b) are a flow diagram illustrating a process for determining the operating frequency and operating power setting for a forge welding machine in a forge welding process based upon an inputted width of the HAZ and weld temperature.
Figure 6B:
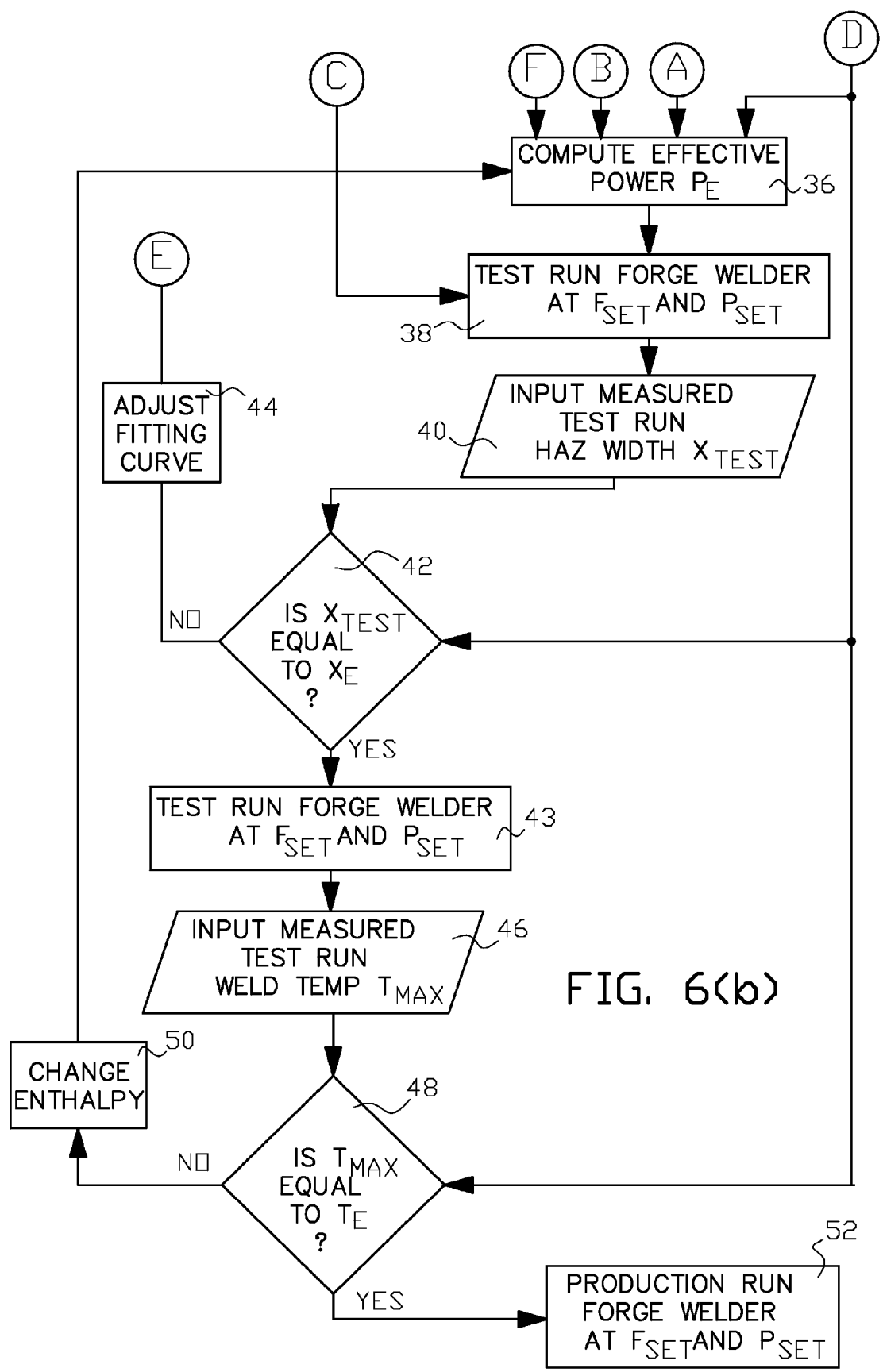

There is illustrated in FIG. 6(a) and FIG. 6(b) one non-limiting example of the system and method of computing the operating parameters of a forge welding machine of the present invention. Although the system and method are directed to the induction forge welding of the longitudinal edges of a metal strip or plate, with appropriate modifications, one skilled in the art may apply the system or method to any forge welding process in which a HAZ is created. The routines in the figures may be embodied in computer program code that is prepared by one skilled in the art and executed with suitable computer hardware, including but not limited to, processors, memory storage devices, and input and output devices. The term "metal" is used for simplicity to describe the material part or parts being forge welded together, including but not limited to metal strips and plates. The term "forge welder" or "forge welding machine" is used for simplicity to generally describe the machinery used for forge welding of the metal, including, but not limited to, a forming machine. The term "forge weld power source" is used for simplicity to generally describe the source of energy that heats the metal for the forge weld, including, but not limited to, an electric induction power source.

In routine 12, material parameters of the metal are entered by any suitable means. For example the operator of a forge welding machine may enter a value for each parameter by a suitable input device, such as a keyboard, or the operator may enter a code representing a specific material for which the values of the required parameters are stored in a suitable memory device, which data is referenced by the system or process of the present invention. Material parameters may include the thickness (h) of the metal; the electrical resistivity ($\rho$) of the metal; the relative magnetic permeability ($\mu$) of the metal; the thermal diffusivity ($\epsilon$) of the metal; the enthalpy (H) of the metal, and the density ($\gamma$) of the metal.

In routine 14 forge welder parameters are entered by any suitable means. For example the operator of a forge welding machine may enter a value for each parameter by a suitable input device, or values for one or more of the parameters may be inputted from a lookup table of values stored in a suitable memory device. The stored values may be based upon the entered material parameters and/or the operating parameters of a specific forge welder, which data is referenced by the system or process of the present invention. Forge welding machine parameters may include the weld heating length and the weld velocity.

In routine 16 forge weld parameters are entered by any suitable means. For example the operator of the forge welder may enter each parameter by a suitable input device, or one or more of the parameters may be inputted from a lookup table of values stored in a suitable memory device based upon the enter material parameters and/or the operating parameters of a specific welding machine. Inputted weld parameters may include an effective width of the HAZ ($X_E$) and the weld point temperature ($T_E$).

In routine 18 a trial thermal reference depth can be computed from equation (2) above in this non-limiting example of the invention. In routine 20 an initial trial electrical welding frequency, $F_0$, is inputted. For example if the forge welder with which the process is being used has a power operating frequency range of from 10 kilohertz to 100 kilohertz, the initial trial frequency may be preset and stored in a suitable memory device as 10 kilohertz, and inputted from the memory device. Alternatively the operator of the forge welding machine may manually enter the initial trial frequency via a suitable input device. In any event since the operating frequency for the selected effective width of the HAZ, $X_E$, is determine by an iterative process as further described below, selection of a particular initial trial frequency is not critical. In routine 22 a trial electrical reference depth can be computed from equation (1) above for this non-limiting example of the invention.

In routine 24 a trial normalized electrical referenced depth, $Z_n$, is calculated from equation (3) above in this non-limiting example of the invention. This value of trial normalized electrical reference depth is inputted into routine 26, which computes a corresponding trial normalized width of the HAZ, $X_n$, from the normalized width of the HAZ equation (4) above in this non-limiting example of the invention.

In routine 28 the trial normalized width of the HAZ, $X_n$, is converted to a calculated width of the HAZ, $X_c$, by multiplying $X_n$ by the trial thermal reference depth, which was computed in routine 18.

In routine 30 the calculated width of the HAZ is compared with the previously inputted effective width of the, $X_E$. If $X_c$, is not equal to $X_E$ within any allowable tolerance, the trial frequency, $F_0$, is changed to a new value in routine 32. For example if $X_c > X_E + \Delta\epsilon$, where $\Delta\epsilon$ is an allowed tolerance value, then the new trial value of $F_0$ would be the old trial value of $F_0$ plus a selected initial incremental frequency change, $\Delta F$. Conversely if $X_c < X_E - \Delta\epsilon$, then the new trial value of $F_0$ would be the old trial value of $F_0$ minus a selected initial incremental frequency change, $\Delta F$. On subsequent iterations, the incremental frequency change, $\Delta F$, is decreased, for example, by half, so that the iterative process ultimately results in a calculated $X_c = X_E \pm \epsilon$, where $\epsilon$ is an allowed tolerance value, if used, for the desired effective width of the HAZ. The trial value of $F_0$ for which $X_c = X_E \pm \epsilon$ is set equal to the set frequency, $F_{SET}$, in routine 34. Any alternative type of suitable iterative method may be used to converge to the set frequency.

In some examples of the invention, the system and method of computing the operating parameters of a forge welding machine may include computing the operating frequency of the forge welding machine. In other examples of the invention, the system and method further includes computing the operating power setting of the forge welding machine.

Figure 1A:
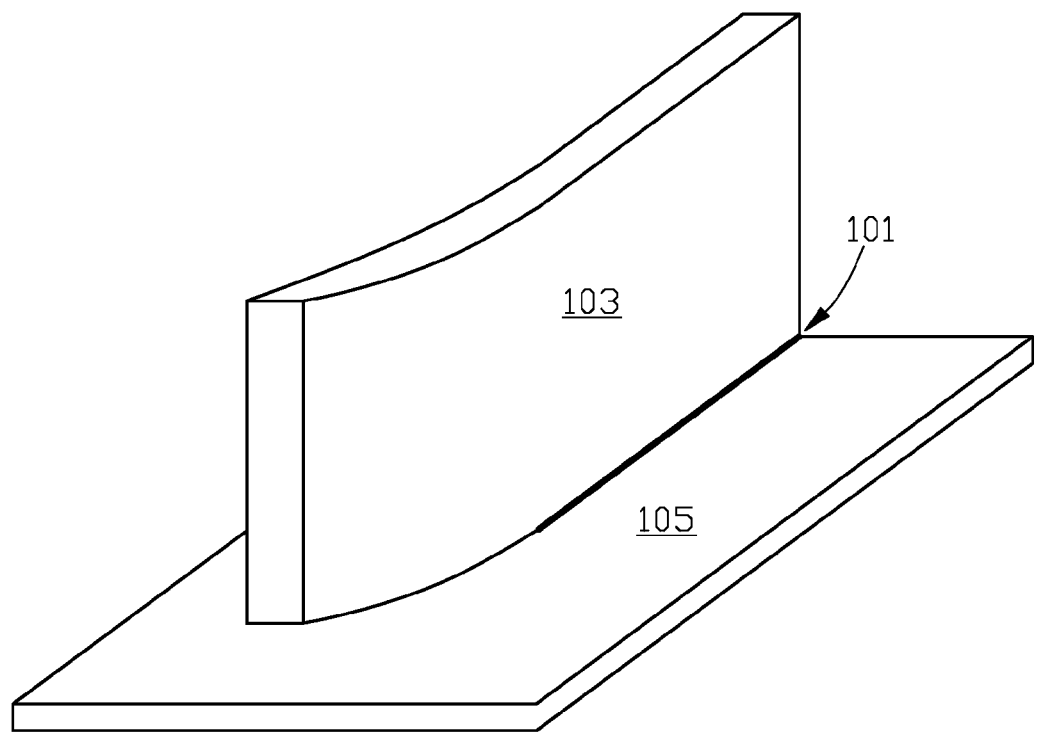
FIG. 1(a) illustrates a typical partial T-joint forge weld and FIG. 1(b) illustrates a typical butt joint forge weld.
Figure 1B:
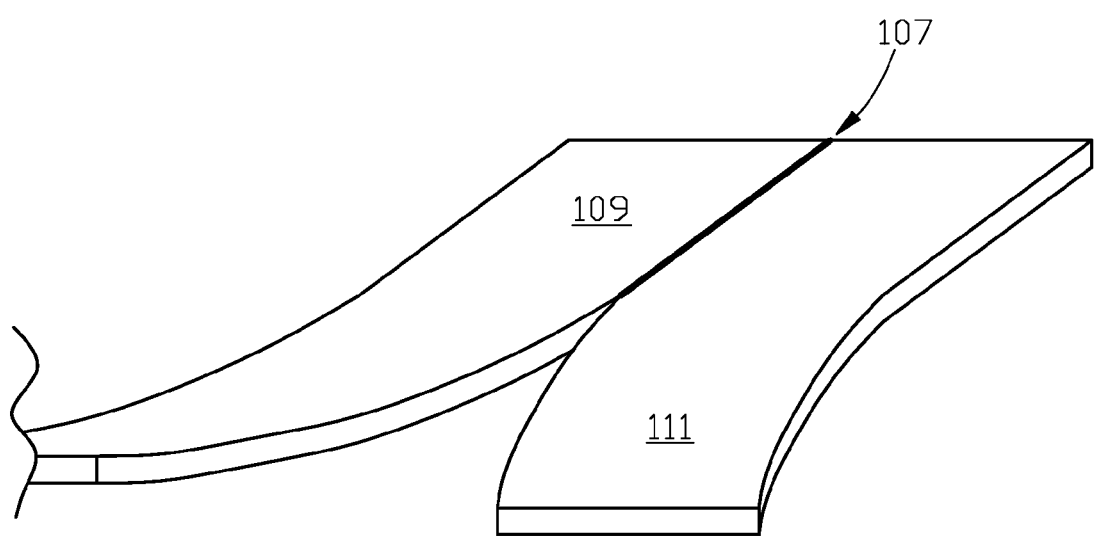
Figure 2:
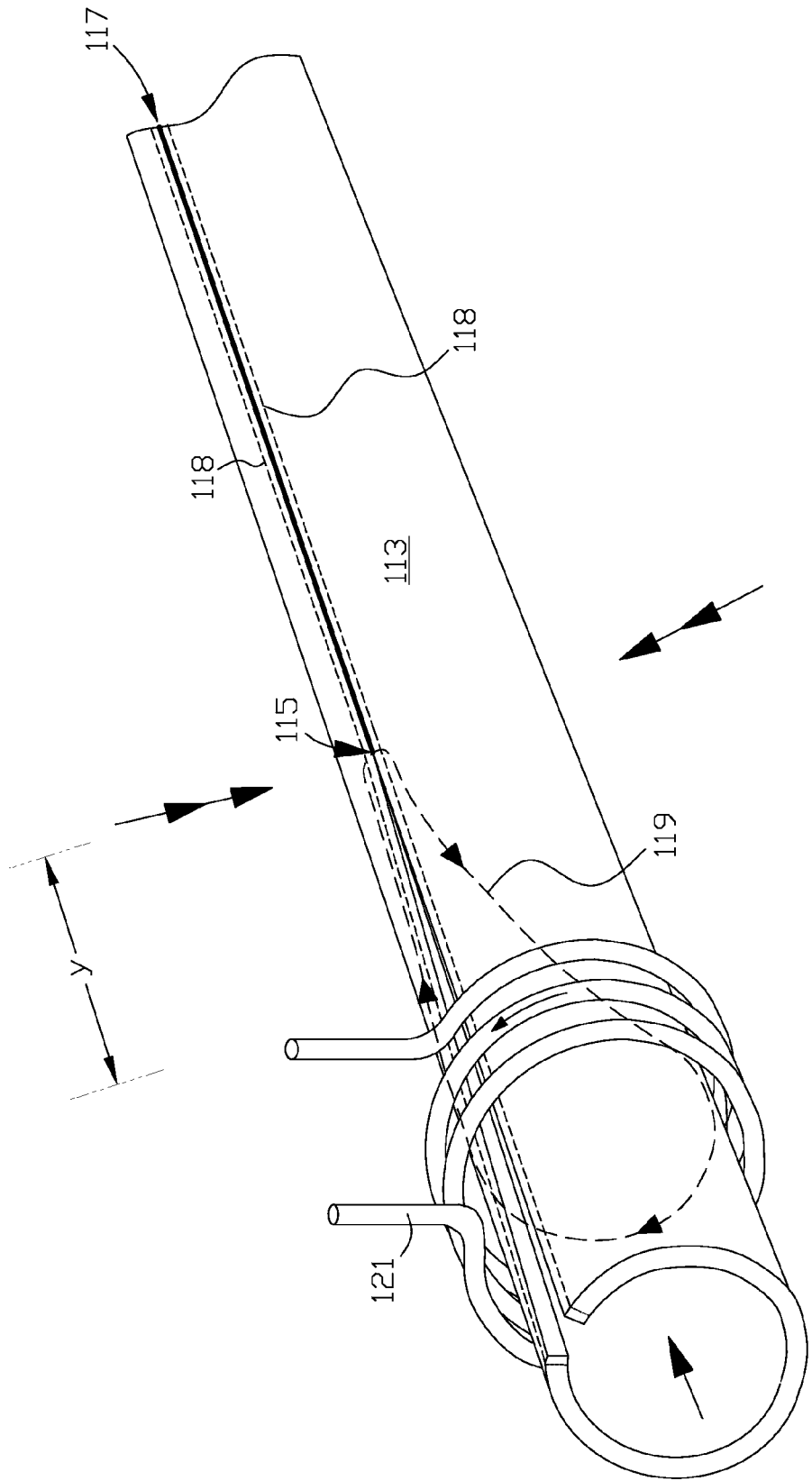
FIG. 2 illustrates typical formation of a tube by forge welding together opposing longitudinal edges of a metal plate or strip.
Figure 3A:
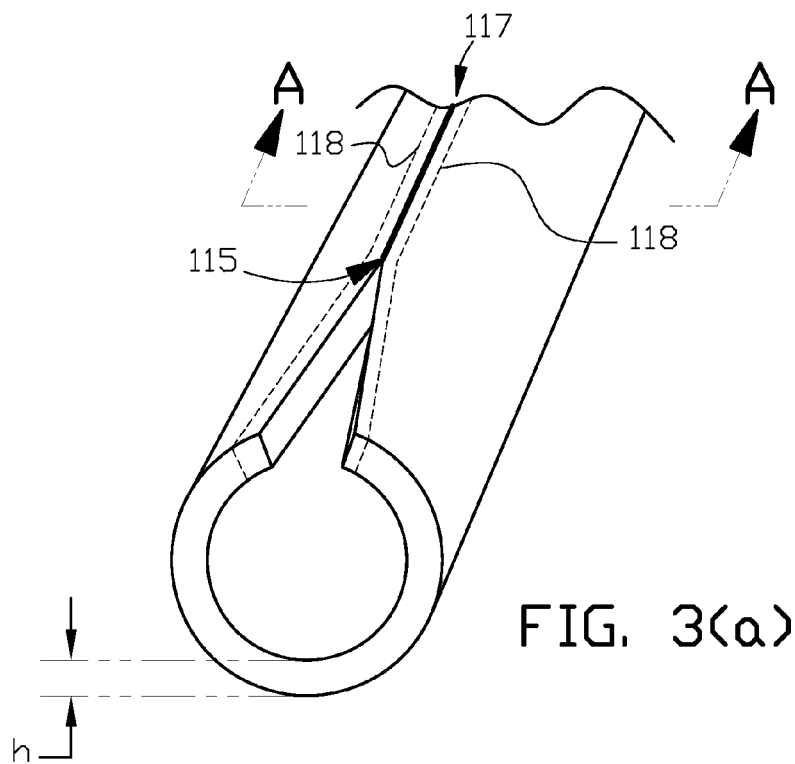
FIG. 3(a) further illustrates parameters associated with the forge welding together of the opposing longitudinal edges of a metal plate or strip to form a tube.
Figure 3B:
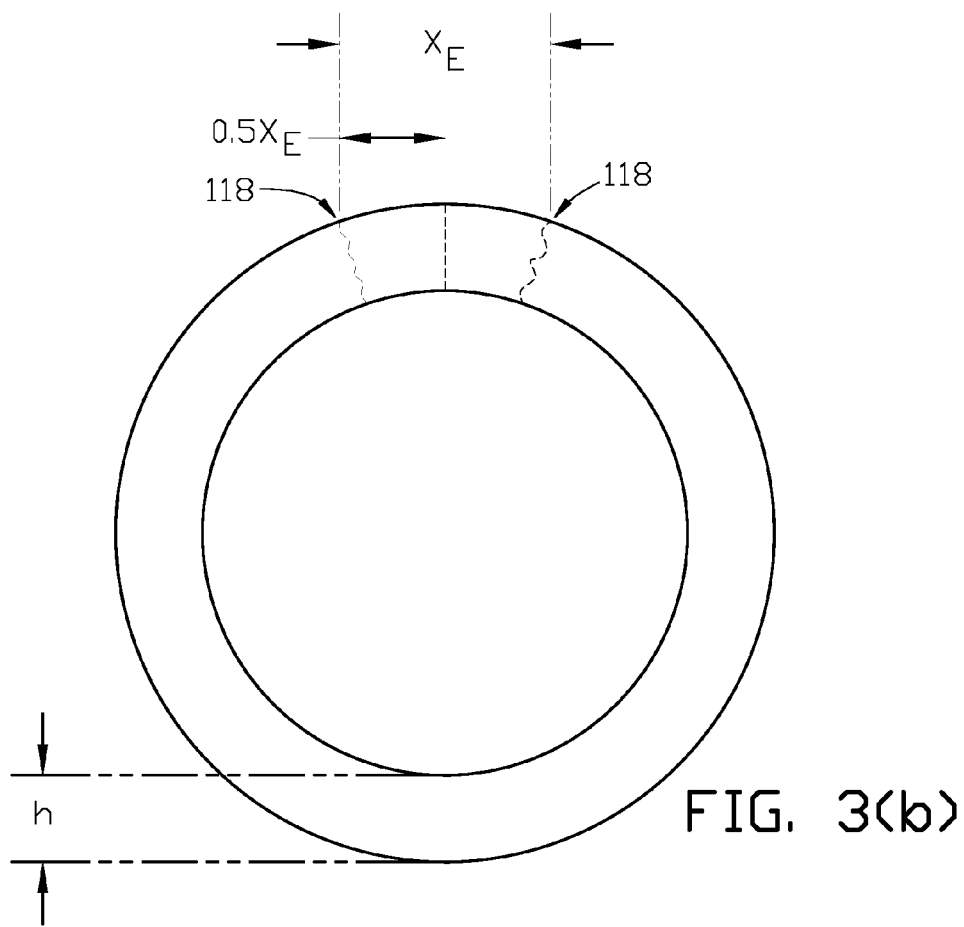
FIG. 3(b) is a cross sectional view through line A-A in FIG. 3(a) with illustration of parameters of a tube formed in a forge welding.
Figure 4:
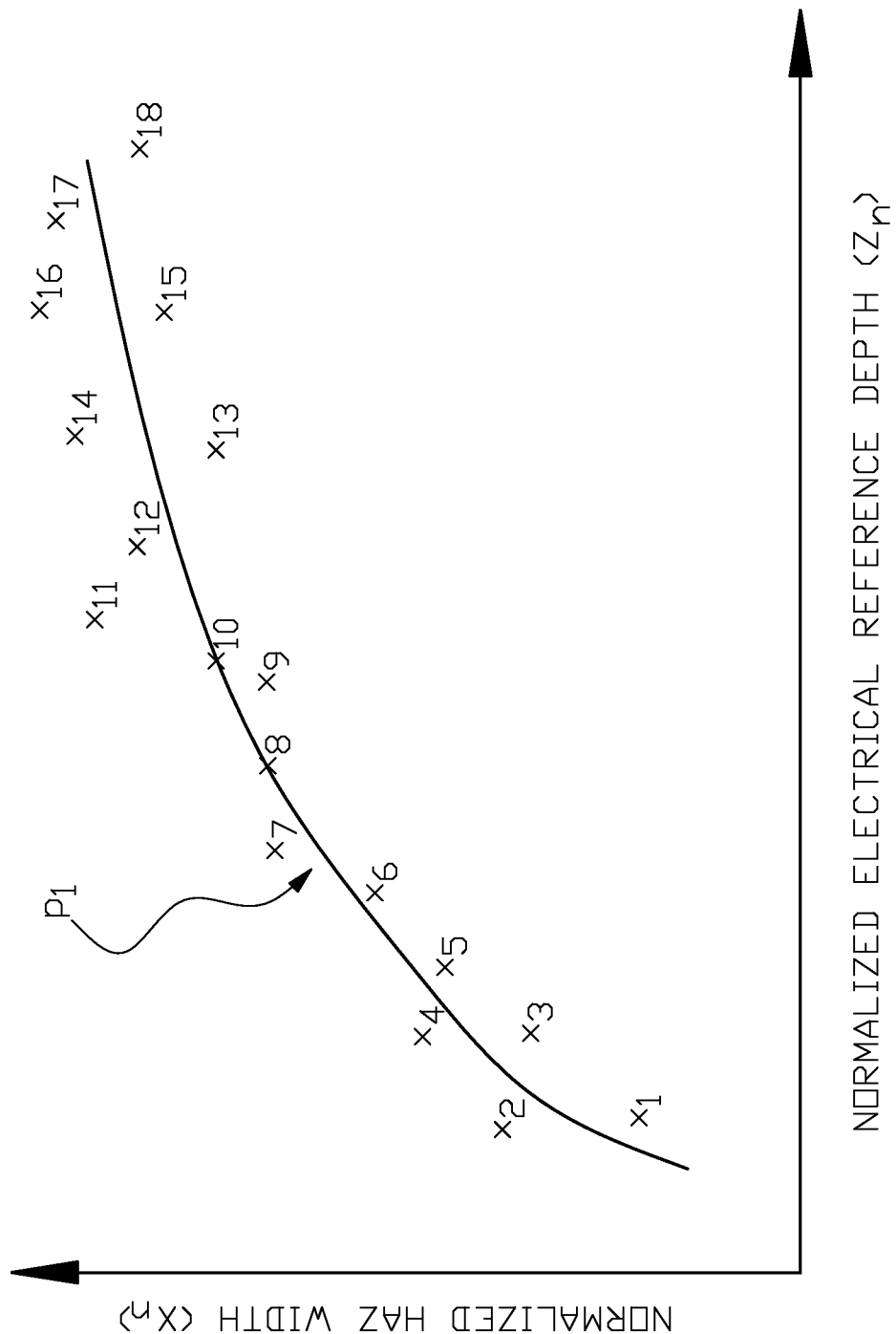
FIG. 4 is a typical graphical illustration of a normalized width of the HAZ polynomial generated from empirical data points.
Figure 5:
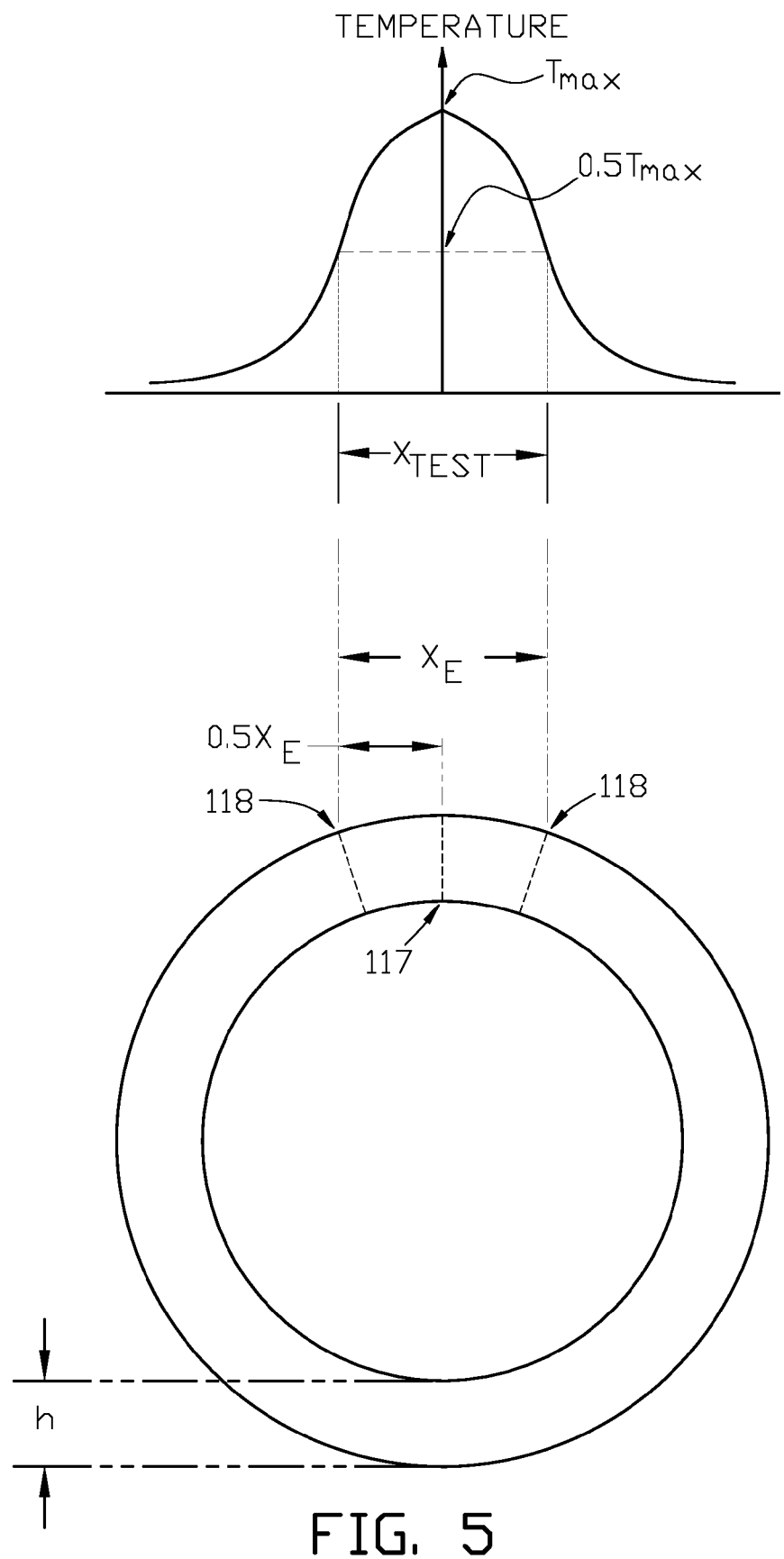
FIG. 5 illustrates a typical temperature distribution curve used to calculate the width of the HAZ.

When $X_c = X_E \pm \epsilon$ is set to the set frequency, $F_{SET}$, in routine 34, effective power, $P_E$, can be computed from equation (5) above in this non-limiting example of the invention in routine 36, and the value of the effective power can be set equal to the set operating power, $P_{SET}$. Routine 38 executes a test forge weld at operating frequency $F_{SET}$ and operating power $P_{SET}$. The actual measured width of the HAZ, $X_{TEST}$, from the test run is inputted in routine 40 from a suitable sensing means, such as a thermal imaging camera. The thermal image analysis may produce a graphical temperature magnitude display versus the cross sectional width of the metal. For example in FIG. 5, maximum temperature, $T_{max}$, occurs at the weld point and trails off from the weld point in a generally bell shaped curve. $X_{TEST}$ can be assigned a typical value, for example, $0.5T_{max}$, as shown in the figure. Alternatively the width of the HAZ may be determined from metallurgical samples cut from a welded tube. The shape of the temperature curve in FIG. 5 and selection of $0.5T_{max}$ as the temperature point for a boundary of the width of the HAZ is a non-limiting selection. For a specific forge welding machine and forge welding process, other temperature curves and temperatures at the boundary of the width of the HAZ may apply. That is the temperature curve and boundary temperature are relative to the forge welding process.

Routine 42 compares the test run width of the HAZ, $X_{TEST}$, with the inputted effective width of the HAZ, $X_E$. If $X_{TEST}$ is not equal to $X_E$ within any allowable tolerance, the width of the HAZ empirically fitted curve is changed by routine 44 wherein the point defined by the $Z_n$ and $X_n$ resulting from set frequency, $F_{SET}$, and set power, $P_{SET}$, and used in the test run, is added to the set of points used to generate the fitted curve, and a new curve fit analysis is conducted.

Routines 26 through 42 are iteratively repeated until the test run width of the HAZ, $X_{TEST}$, is equal to the inputted width of the HAZ, $X_E$, within any allowable tolerance. Then routine 43 continues the test run and actual test weld point temperature, $T_{MAX}$, is compared with inputted effective weld point temperature, $T_E$, in routine 48. Actual test weld point temperature is inputted in routine 46 using a suitable sensor, such as a pyrometer. If $T_{MAX}$ is not equal to the effective weld point temperature, $T_E$, within an allowable tolerance, the value of enthalpy (H) for the material is changed to a new value in routine 50 and a new value for effective power, $P_E$, is calculated in routine 36. For example if $T_{MAX} > T_E + \Delta\epsilon$, where $\Delta\epsilon$ is an allowed tolerance value, then the new value of the enthalpy (H) would be the old value minus a selected incremental change, $\Delta H$. Conversely if $T_{MAX} > T_E - \Delta\epsilon$, then the new value of enthalpy (H) would be the old value of enthalpy (H) plus a selected incremental change, $\Delta H$. On subsequent iterations, the incremental change in enthalpy, $\Delta H$, is decreased, for example, by half, so that the iterative process ultimately results in a calculated $T_{MAX} > T_E + \Delta\epsilon$, where $\epsilon$ is an allowed tolerance value, if used, for the desired effective width of the HAZ. Routines 36 through 48 are iteratively executed until $T_{MAX}=T_E\pm\epsilon$, where $\epsilon$ is an allowed tolerance value for the desired effective weld point temperature. When this condition is satisfied routine 52 sets the production run at forge welder operating frequency, $F_{SET}$, and operating power, $P_{SET}$.

U.S. Pat. No. 5,902,506 and No. 5,954,985 disclose apparatus for and methods of adjusting the frequency and power magnitude of an induction forge welder power source that can be used in the process of the present invention.

Therefore in one example of the system and method of computing the operating parameters of a forge welding machine of the present invention, a computer program can be used to compute the operating frequency and operating power setting for the forge welding machine in response to an inputted width of the heat affected zone and an inputted weld temperature. The computation may be based upon forge welding machine data and data of parameters of the one or more materials to be welded in the forge welding process. The above examples of the invention illustrate some of the non-limiting forge welding machine data and data of parameters of the one or more materials that can be used in the system or process of the present invention.

The foregoing examples do not limit the scope of the disclosed invention. The scope of the disclosed invention is further set forth in the appended claims.

The invention claimed is:

1. A method of setting an operating frequency of a forge welding machine for a preferred effective width of the heat affected zone during the forge weld of one or more materials forming a weld heating length when the one or more materials move past a forge weld point at a weld velocity, each of the one or more materials having a thermal diffusivity value; an electrical resistivity value; a relative magnetic permeability value; a density value; and a thickness, the method using a processor executing a forge welding computer program, the method comprising the steps of:

(a) using the processor to input a value for the preferred effective width of the heat affected zone to the forge welding computer program;

(b) using the processor to input a value for a trial forge welding machine operating frequency to the forge welding computer program;

(c) using the processor to determine a calculated width of the heat affected zone by multiplying a computed trial normalized width of the heat affected zone by a trial normalized thermal reference depth within execution of the forge welding computer program, the computed trial normalized width of the heat affected zone determined from the value for the trial forge welding machine operating frequency; and (d) using the processor to set the operating frequency of the forge welding machine to the value for the trial forge welding machine operating frequency if the difference between the calculated width of the heat affected zone and the value for the preferred effective width of the heat affected zone is within a tolerance value of zero, or to incrementally change the value for the trial forge welding machine operating frequency within execution of the forge welding computer program and repeating the processor execution of the above series of operations comprising steps (b) through (d) with the incrementally changed trial forge welding machine operating frequency replacing the value for the trial forge welding machine frequency if the difference between the calculated width of the heat affected zone and the value for the preferred effective width of the heat affected zone is not within the tolerance value of zero.

2. The method of claim 1 wherein the computed trial normalized width of the heat affected zone is determined by the processor within execution of the forge welding computer program by substituting a value for a trial normalized electrical reference depth in a heat affected zone (HAZ) polynomial stored in a memory device.

3. The method of claim 2 wherein the value for the trial normalized electrical reference depth is determined by the processor within execution of the forge welding computer program by dividing a trial electrical reference depth, $\xi$, by a trial thermal reference depth, $\delta$, where the trial electrical reference depth is established by $$\xi = \sqrt{\frac{\rho}{\pi f \mu}}$$

with $\rho$ being the value of electrical resistivity for each one of the one or more materials, $\mu$ being the value of relative magnetic permeability for each one of the one or more materials, and f being the value for the trial forge welding machine operating frequency.

4. The method of claim 3 wherein the trial thermal reference depth is established by $$\delta = \sqrt{\frac{\pi \varepsilon y}{4v}}$$

with $\varepsilon$ being the value of thermal diffusivity of each one of the one or more materials, y being the weld heating length, and v being the weld velocity.

5. The method of claim 1 wherein the computed trial normalized width of the heat affected zone is determined by the processor within execution of the forge welding computer program by substituting a value for a trial normalized electrical reference depth in a heat affected zone (HAZ) polynomial stored in a memory device, the value for the trial normalized electrical reference depth determined by the processor within execution of the forge welding computer program by dividing a trial electrical reference depth, $\xi$, by a trial thermal reference depth, $\delta$, where the trial electrical reference depth is established by $$\xi = \sqrt{\frac{\rho}{\pi f \mu}}$$

with $\rho$ being the value of electrical resistivity for each one of the one or more materials, $\mu$ being the value of relative magnetic permeability for each one of the one or more materials, and f being the value for the trial forge welding machine operating frequency.

6. The method of claim 5 wherein the trial thermal reference depth is established by $$\delta = \sqrt{\frac{\pi \varepsilon y}{4v}}$$

with $\varepsilon$ being the value of thermal diffusivity of each one of the one or more materials, y being the weld heating length, and v being the weld velocity.

7. The method of claim 1 further comprising the steps of:
(e) using the processor to determine a value for a calculated effective power, $P_E$, established by $$P_E = H \cdot \gamma \cdot X_E \cdot h \cdot v$$

within execution of the forge welding computer program, where H is a value for a trial enthalpy of the forge welding; γ is the density for each one of the one or more materials; $X_E$ is the value for the preferred effective width of the heat effective zone; h is the thickness for each one of the one or more materials; and v is the weld velocity;

(f) using the processor to compare the difference between a power test width of the heat affected zone from a power test forge welding and the value for the preferred effective width of the heat affected zone, the power test forge welding performed by the forge welding machine at the operating frequency and the value for the calculated effective power; and (g) using the processor to set an operating power of the forge welding machine to the value for the calculated effective power if the difference between the power test width of the heat affected zone and the value for the preferred effective width of the heat affected zone is within a tolerance value of zero, or modifying the heat affected zone (HAZ) polynomial by the processor within execution of the forge welding computer program by using the processor to input a value for a power test normalized electrical reference depth and a value for a power test normalized width of the heat affected zone for modification of the heat affected zone (HAZ) polynomial from the power test forge welding to determine a modified heat affected zone (HAZ) polynomial, and repeating the processor execution of the above series of operations comprising steps (e) through (g) with the modified heat affected zone (HAZ) polynomial.

8. The method of claim 7 further comprising the steps of:
using the processor to input a value for a preferred effective weld point temperature to the forge welding computer program;

(h) using the processor to compare the difference between a temperature test weld point temperature from a temperature test forge welding and the value for the preferred effective weld point temperature, the temperature test forge welding performed by the forge welding machine operating at the operating frequency and the operating power; and (i) using the processor to determine if the difference between the temperature test weld point temperature and the value for the preferred effective weld point temperature is not within a tolerance value of zero, and if the difference between the temperature test weld point temperature and the value for the preferred effective weld point temperature is not within a tolerance value of zero, using the processor to incrementally change the value for the trial enthalpy of the forge welding and repeating the processor execution of the above series of operations comprising steps (e) through (i) with the incrementally changed trial enthalpy replacing the value for the trial enthalpy of the forge welding.

9. A method of setting an operating frequency of a forge welding machine for a preferred effective width of the heat affected zone during the forge weld of one or more materials forming a weld heating length when the one or more materials move past a forge weld point at a weld velocity, each of the one or more materials having a thermal diffusivity value; an electrical resistivity value; a relative magnetic permeability value; a density value; and a thickness, the method using a processor executing a forge welding computer program, the method comprising the steps of:

(a) using the processor to input a value for the preferred effective width of the heat affected zone to the forge welding computer program;

(b) using the processor to input a value for a trial forge welding machine operating frequency to the forge welding computer program;

(c) using the processor to determine a calculated width of the heat affected zone by multiplying a computed trial normalized width of the heat affected zone by a trial normalized thermal reference depth within execution of the forge welding computer program, the computed trial normalized width of the heat affected zone determined by the processor within execution of the forge welding computer program by substituting a value for a trial normalized electrical reference depth in a heat affected zone (HAZ) polynomial stored in a memory device, the value for the trial normalized electrical reference depth determined by the processor within execution of the forge welding computer program by dividing a trial electrical reference depth, ξ, by a trial thermal reference depth, δ, where the trial electrical reference depth is established by $$\xi = \sqrt{\frac{\rho}{\pi f \mu}}$$

with ρ being the value of electrical resistivity for each one of the one or more materials, μ being the value of relative magnetic permeability for each one of the one or more materials, and f being the value for the trial forge welding machine operating frequency; and the trial thermal reference depth is established by $$\delta = \sqrt{\frac{\pi \varepsilon y}{4v}}$$

with ε being the value of thermal diffusivity of each one of the one or more materials, y being the weld heating length, and v being the weld velocity; and (d) using the processor to set the operating frequency of the forge welding machine to the value for the trial forge welding machine operating frequency if the difference between the calculated width of the heat affected zone and the value for the preferred effective width of the heat affected zone is within a tolerance value of zero, or to incrementally change the value for the trial forge welding machine operating frequency within execution of the forge welding computer program and repeating the processor execution of the above series of operations comprising steps (b) through (d) with the incrementally changed trial forge welding machine operating frequency replacing the value for the trial forge welding machine frequency if the difference between the calculated width of the heat affected zone and the value for the preferred effective width of the heat affected zone is not within the tolerance value of zero.

10. The method of claim 9 further comprising the steps of:
(e) using the processor to determine a value of a calculated effective power, $P_E$, established by $$P_E = H \cdot \gamma \cdot X_E \cdot h \cdot v$$

within execution of the forge welding computer program, where H is a value of a trial enthalpy of the forge welding; γ is the density of each one of the one or more materials; $X_E$ is the value of the preferred effective width of the heat effective zone; h is the thickness of each one of the one or more materials; and v is the weld velocity;

(f) using the processor to compare the difference between a power test width of the heat affected zone from a power test forge welding and the value for the preferred effective width of the heat affected zone, the power test forge welding performed by the forge welding machine at the operating frequency and the value for the calculated effective power; and (g) using the processor to set an operating power of the forge welding machine to the value for the calculated effective power if the difference between the power test width of the heat affected zone and the value for the preferred effective width of the heat affected zone is within a tolerance value of zero, or modifying the heat affected zone (HAZ) polynomial by the processor within execution of the forge welding computer program by using the processor to input a value for a power test normalized electrical reference depth and a value for a power test normalized width of the heat affected zone for modification of the heat affected zone (HAZ) polynomial from the power test forge welding to determine a modified heat affected zone (HAZ) polynomial, and repeating the processor execution of the above series of operations comprising steps (e) through (g) with the modified heat affected zone (HAZ) polynomial.

11. The method of claim 10 further comprising the steps of: using the processor to input a value for a preferred effective weld point temperature to the forge welding computer program;

(h) using the processor to compare the difference between a temperature test weld point temperature from a temperature test forge welding and the value for the preferred effective weld point temperature, the temperature test forge welding performed by the forge welding machine operating at the operating frequency and the operating power; and (i) using the processor to determine if the difference between the temperature test weld point temperature and the value for the preferred effective weld point temperature is not within a tolerance value of zero, and if the difference between the temperature test weld point temperature and the value for the preferred effective weld point temperature is not within a tolerance value of zero, using the processor to incrementally change the value for the trial enthalpy of the forge welding and repeating the processor execution of the above series of operations comprising steps (e) through (i) with the incrementally changed trial enthalpy replacing the value for the trial enthalpy of the forge welding.

12. A method of setting an operating frequency of a forge welding machine for a preferred effective width of the heat affected zone during the forge weld of one or more materials forming a weld heating length when the one or more materials move past a forge weld point at a weld velocity, each of the one or more materials having a thermal diffusivity value; an electrical resistivity value; a relative magnetic permeability value; a density value; and a thickness, the method using a processor executing a forge welding computer program, the method comprising the steps of:

(a) using the processor to input a value for the preferred effective width of the heat affected zone to the forge welding computer program;

(b) using the processor to input a value for a trial forge welding machine operating frequency to the forge welding computer program;

(c) using the processor to determine a calculated width of the heat affected zone by multiplying a computed trial normalized width of the heat affected zone by a trial normalized thermal reference depth within execution of the forge welding computer program, the computed trial normalized width of the heat affected zone determined by the processor within execution of the forge welding computer program by substituting a value for a trial normalized electrical reference depth in a heat affected zone (HAZ) polynomial stored in a memory device, the value for the trial normalized electrical reference depth determined by the processor within execution of the forge welding computer program by dividing a trial electrical reference depth, ξ, by a trial thermal reference depth, where the trial electrical reference depth is established by $$\xi = \sqrt{\frac{\rho}{\pi f \mu}}$$

with ρ being the value of electrical resistivity for each one of the one or more materials, μ being the value of relative magnetic permeability for each one of the one or more materials, and f being the value for the trial forge welding machine operating frequency; and the trial thermal reference depth is established by $$\delta = \sqrt{\frac{\pi \varepsilon y}{4v}}$$

with ε being the value of thermal diffusivity of each one of the one or more materials, y being the weld heating length, and v being the weld velocity;

(d) using the processor to set the operating frequency of the forge welding machine to the value for the trial forge welding machine operating frequency if the difference between the calculated width of the heat affected zone and the value for the preferred effective width of the heat affected zone is within a tolerance value of zero, or to incrementally change the value for the trial forge welding machine operating frequency within execution of the forge welding computer program and repeating the processor execution of the above series of operations comprising steps (b) through (d) with the incrementally changed trial forge welding machine operating frequency replacing the value for the trial forge welding machine frequency if the difference between the calculated width of the heat affected zone and the value for the preferred effective width of the heat affected zone is not within the tolerance value of zero;

(e) using the processor to determine a value for a calculated effective power, $P_E$, established by $$P_E = H \cdot \gamma \cdot X_E \cdot h \cdot v$$

within execution of the forge welding computer program, where H is a value for a trial enthalpy of the forge welding; γ is the density for each one of the one or more materials; $X_E$ is the value for the preferred effective width of the heat effective zone; h is the thickness for each one of the one or more materials; and v is the weld velocity;

(f) using the processor to compare the difference between a power test width of the heat affected zone from a power test forge welding and the value for the preferred effective width of the heat affected zone, the power test forge welding performed by the forge welding machine at the operating frequency and the value for the calculated effective power; and (g) using the processor to set an operating power of the forge welding machine to the value for the calculated effective power if the difference between the power test width of the heat affected zone and the value for the preferred effective width of the heat affected zone is within a tolerance value of zero, or modifying the heat affected zone (HAZ) polynomial by the processor within execution of the forge welding computer program by using the processor to input a value for a power test normalized electrical reference depth and a value for a power test normalized width of the heat affected zone for modification of the heat affected zone (HAZ) polynomial from the power test forge welding to determine a modified heat affected zone (HAZ) polynomial, and repeating the processor execution of the above series of operations comprising steps (e) through (g) with the modified heat affected zone (HAZ) polynomial.

13. The method of claim 12 further comprising the steps of:
using the processor to input a value for a preferred effective weld point temperature to the forge welding computer program;

(h) using the processor to compare the difference between a temperature test weld point temperature from a temperature test forge welding and the value for the preferred effective weld point temperature, the temperature test forge welding performed by the forge welding machine operating at the operating frequency and the operating power; and (i) using the processor to determine if the difference between the temperature test weld point temperature and the value for the preferred effective weld point temperature is not within a tolerance value of zero, and if the difference between the temperature test weld point temperature and the value for the preferred effective weld point temperature is not within a tolerance value of zero, using the processor to incrementally change the value for the trial enthalpy of the forge welding and repeating the processor execution of the above series of operations comprising steps (e) through (i) with the incrementally changed trial enthalpy replacing the value for the trial enthalpy of the forge welding.

\* \* \* \* \*